United States Patent
Chen et al.

(10) Patent No.: US 9,425,663 B2
(45) Date of Patent: Aug. 23, 2016

(54) DISTRIBUTED WINDING ARRANGEMENT FOR AN ELECTRIC MOTOR

(71) Applicant: Black & Decker Inc., Newark, DE (US)

(72) Inventors: Wei Chen, Suzhou (CN); Jin Fujun, Suzhou (CN); Steven Swaddle, Durham (GB); Timothy W. French, Jr., Hampstead, MD (US)

(73) Assignee: BLACK & DECKER INC., New Britain, CT (US)

( * ) Notice: Subject to any disclaimer, the term of this patent is extended or adjusted under 35 U.S.C. 154(b) by 651 days.

(21) Appl. No.: 13/942,298

(22) Filed: Jul. 15, 2013

(65) Prior Publication Data
US 2014/0049133 A1    Feb. 20, 2014

Related U.S. Application Data (60) Provisional application No. 61/684,191, filed on Aug. 17, 2012.

(51) Int. Cl.
| | |
|---|---|
| *H02K 3/38* | (2006.01) |
| *H02K 23/26* | (2006.01) |
| *H02K 23/30* | (2006.01) |
| *H02K 3/12* | (2006.01) |
| *H02K 23/38* | (2006.01) |

(52) U.S. Cl.
CPC .................. *H02K 3/12* (2013.01); *H02K 23/30* (2013.01); *H02K 23/38* (2013.01); *H02K 2213/03* (2013.01)

(58) Field of Classification Search
CPC ........... H02K 3/00; H02K 3/12; H02K 23/26; H02K 23/28; H02K 23/30; H02K 23/32; H02K 23/38

USPC ......... 310/179, 180, 184, 198, 220, 224, 225, 310/234

See application file for complete search history.

(56) References Cited

U.S. PATENT DOCUMENTS

| | | | |
|---|---|---|---|
| 2,502,964 A | 2/1948 | Klima | |
| 2,598,464 A | 5/1952 | Thomas | |
| 3,733,506 A | 5/1973 | Jaffe et al. | |
| 4,329,610 A * | 5/1982 | Klein | H02K 23/30 310/198 |

(Continued)

FOREIGN PATENT DOCUMENTS

| | | |
|---|---|---|
| DE | 10360007 | 8/1958 |
| DE | 109482 | 11/1974 |

(Continued)

OTHER PUBLICATIONS

PCT/US2013/055105 ISR and Written Opinion. (Oct. 20, 2014).

(Continued)

*Primary Examiner* — Tran Nguyen
(74) *Attorney, Agent, or Firm* — Harness, Dickey & Pierce, P.L.C.

(57) ABSTRACT

A distributed winding arrangement for an electric motor is provided that reduces brush arcing while reducing the size of the commutator. The electric motor is comprised generally of an armature having a plurality of spaced apart posts defining a plurality of spaced apart winding slots; a stator disposed coaxially with the armature; and a commutator having a plurality of commutator bars, where the number of commutator bars is an integer greater than the number of winding slots but less than twice the number of winding slots provided by the armature.

20 Claims, 6 Drawing Sheets

(56) References Cited

U.S. PATENT DOCUMENTS

| | | | |
|---|---|---|---|
| 4,857,790 A * | 8/1989 | Kamiyama | H02K 23/26 310/198 |
| 6,566,782 B1 | 5/2003 | Wang | |
| 6,841,914 B2 * | 1/2005 | Maeda | H02K 23/26 310/198 |
| 6,930,429 B2 * | 8/2005 | Wang | H02K 23/30 310/198 |
| 7,000,307 B2 * | 2/2006 | Wang | H02K 23/30 29/596 |
| 7,051,420 B2 | 5/2006 | Wang | |
| 7,155,811 B2 | 1/2007 | Wang | |
| 7,274,126 B2 * | 9/2007 | Walter | H02K 23/30 310/198 |
| 7,388,312 B2 | 6/2008 | Hyodo et al. | |
| 7,567,007 B2 | 7/2009 | Furui | |
| 7,723,890 B2 | 5/2010 | Sakurai | |
| 8,193,673 B2 | 6/2012 | Zhao et al. | |
| 2006/0244334 A1 | 11/2006 | Furui | |
| 2008/0016673 A1 | 1/2008 | Walter et al. | |
| 2009/0236928 A1 | 9/2009 | Hawighorst | |
| 2011/0012470 A1 | 1/2011 | Li et al. | |
| 2011/0127871 A1 | 6/2011 | Roos | |
| 2011/0260569 A1 | 10/2011 | Liu et al. | |
| 2011/0260573 A1 | 10/2011 | Liu et al. | |

FOREIGN PATENT DOCUMENTS

| | | |
|---|---|---|
| DE | 19818104 | 6/1999 |
| DE | 102004012432 | 9/2005 |
| DE | 102011018294 | 11/2011 |
| DE | 102011081035 | 2/2013 |
| GB | 816121 | 7/1959 |
| JP | 2008278689 | 11/2008 |
| JP | 2010068668 | 3/2010 |
| JP | 2013013267 | 1/2013 |

OTHER PUBLICATIONS

European Search Report for EP 13180771.1.

* cited by examiner

FIG. 7

DISTRIBUTED WINDING ARRANGEMENT FOR AN ELECTRIC MOTOR

CROSS-REFERENCE TO RELATED APPLICATIONS

This application claims the benefit of U.S. Provisional Application No. 61/684,191 filed Aug. 17, 2012. The entire disclosure of the above application is incorporated herein by reference.

FIELD

The present disclosure relates to electric motors and more particularly to a distributed winding arrangement that reduces brush arcing while reducing the size of the commutator.

BACKGROUND

Figure 1:
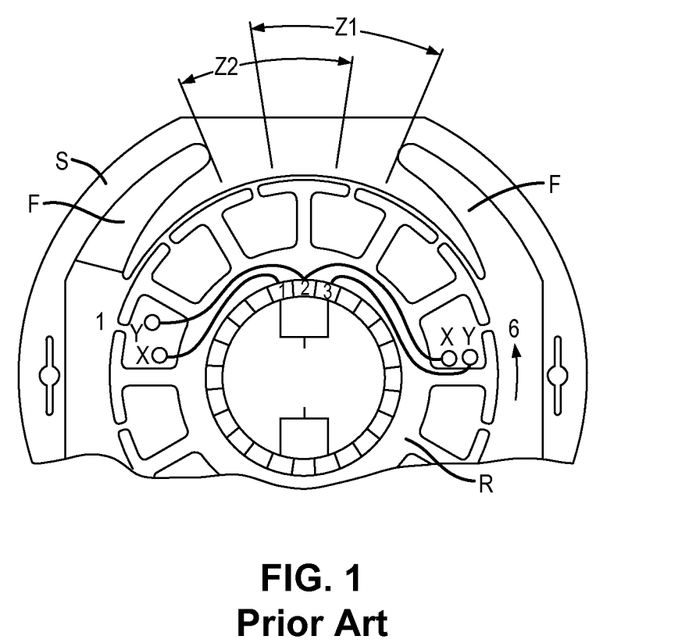
FIG. 1 is a simplified diagrammatic end view of an armature having a traditional coil winding pattern.

Brush commutated electric motors generally include an armature having a plurality of coils wound in slots formed in the lamination stack of the armature. With traditional motor designs, the lamination stack of the armature forms a plurality of circumferentially arranged slots extending between adjacent pairs of lamination posts. Two coils per slot are typically used when winding the armature coils on the lamination stack. Among the two coils of the same slot, the one which commutates first is referred to as the first coil and the one which commutates second as the second coil. The second coil has inherently poorer magnetic commutation than the first coil because the second coil passes beyond the magnetic neutral zone within the stator before it finishes commutation. This is illustrated in simplified fashion in FIG. 1, wherein the commutation zone of the first coil is designated by $Z_1$ and the commutation zone of the second coil is designated by $Z_2$. A rotor R is shown positioned within the stator S having field coils F. As a result, the second coil commutation can generate significant brush arcing, and becomes the dominant source of the total brush arcing of the motor. This can also cause electro-magnetic interference (EMI) to be generated which exceeds acceptable levels set by various government regulatory agencies. This brush arcing can also lead to accelerated brush wear.

To address these concerns, distributed winding arrangements have been developed that reduce brush arcing and improve commutation efficiency of an electric motor. It remains desirable, however, to reduce the size and cost of electric motors while maintaining the improved commutation performance achieved by the distributed winding arrangements. This section provides background information related to the present disclosure which is not necessarily prior art.

SUMMARY

A distributed winding arrangement is provided for an electric motor that reduces brush arcing while reducing the size of the commutator. The electric motor is comprised generally of an armature having a plurality of spaced apart posts defining a plurality of spaced apart winding slots; a stator disposed coaxially with the armature; and a commutator having a plurality of commutator bars, where the number of commutator bars is an integer greater than the number of winding slots but less than twice the number of winding slots provided by the armature.

In one arrangement, the number of commutator bars is defined as one and one half times the number of winding slots defined by the armature. Accordingly, the winding arrangement for the armature includes at least a first coil, a second coil, and a third coil. The first coil is wound only in a first pair of spaced apart ones of the winding slots. The second coil has first and second subcoil portions serially coupled together, such that the first subcoil portion is wound in the first pair of spaced apart winding slots, and the second subcoil portion is wound in a second pair of spaced apart winding slots that are circumferentially offset from the first pair of spaced apart winding slots. The first coil and the first subcoil portion of the second coil are wound with different number of winding turns so that a resultant magnetic axis of the first coil lies at a predetermined angular position relative to a first pair of commutator bars to which the first coil is secured.

The third coil has a first and second subcoil portions serially coupled together, such that the first subcoil portion is wound in the second pair of spaced apart winding slots, and the second subcoil portion is wound in a third pair of spaced apart winding slots that are circumferentially offset from the second pair of spaced apart winding slots. The second subcoil portion of the second coil and the first subcoil portion of the third coil are wound with different number of winding turns so that a resultant magnetic axis of the second coil lies at a predetermined angular position relative to a second pair of commutator bars to which the second coil is secured.

More specifically, the first subcoil portion of the second coil has a number of winding turns that is one third the number of winding turns of the first coil, and the second subcoil portion of the second coil has a number of winding turns that is two thirds the number of winding turns of the first coil.

Similarly, the subcoil portion of the third coil has a number of winding turns that is two thirds the number of winding turns of the first coil, and the second subcoil portion of the third coil has a number of winding turns that is one third the number of winding turns of the first coil.

The winding arrangement may further include a fourth coil that is wound only in the third pair of spaced apart winding slots. The second subcoil portion of the third coil and the fourth coil are wound with different number of winding turns so that a resultant magnetic axis of the third coil lies at a predetermined angular position relative to a third pair of commutator bars to which the third coil is secured. This winding pattern may be repeated for the remainder of the winding slots.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 2:
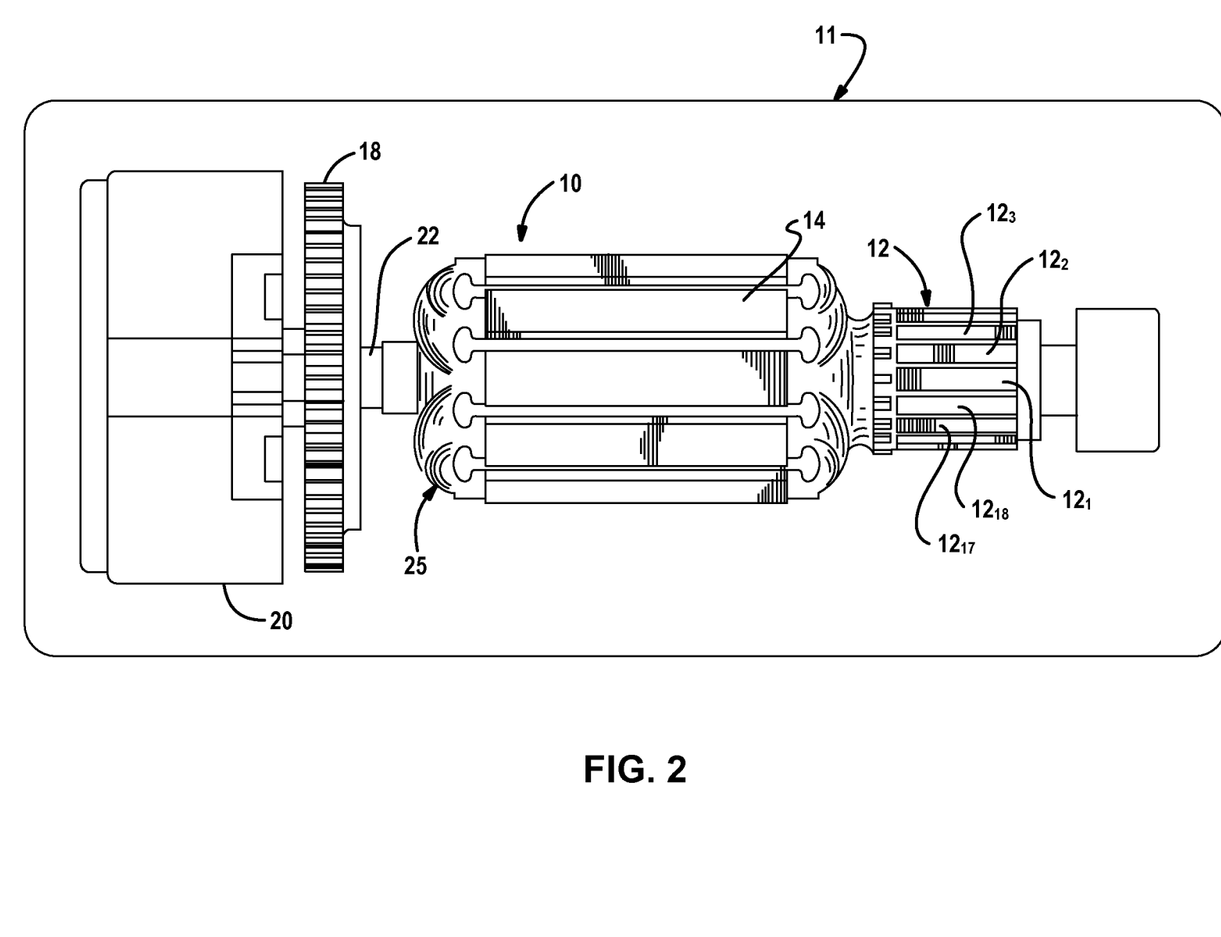
FIG. 2 a side view of an exemplary construct for an electric motor.

FIG. 2 depicts an exemplary electric motor 11. The electric motor is comprised generally of an armature 10; a stator (not shown) disposed coaxially with the armature; and a commutator 12 having a plurality of commutator bars. The armature 10 further includes a lamination stack 14 used to support a plurality of coils 25 wound thereon. An armature shaft 22 extends through the lamination stack 14 and is fixedly coupled to a gear reduction assembly 20 and to a fan 18. It will be appreciated, though, that the fan 18 and the gear reduction assembly 20 are optional and not essential to the motor arrangement, and shown merely because they are components that are often used in connection with an armature for an electric motor. The commutator 12, by way of example, includes eighteen (18) independent commutator bars or segments $12_1$-$12_{18}$. While reference is made to a particular motor arrangement, it is readily understood that the concepts set forth herein may be extended to other types of electric motor arrangements.

Figure 3:
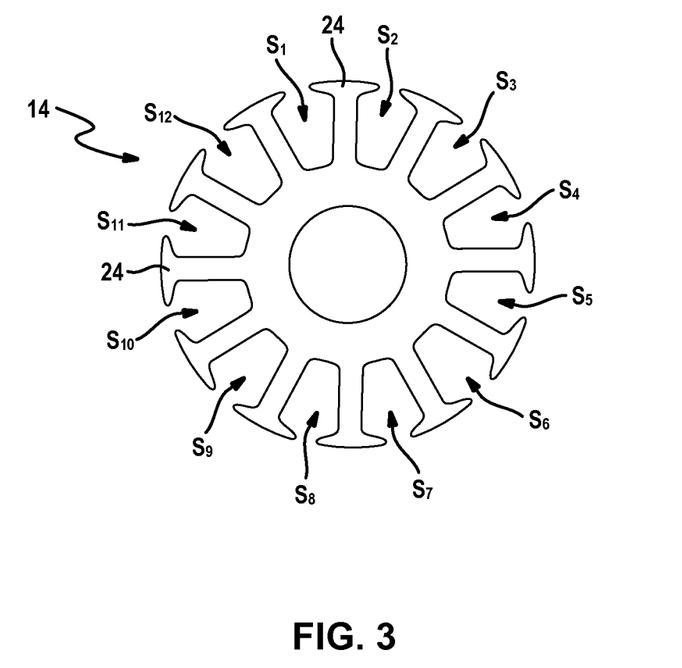
FIG. 3 is a simplified cross-sectional end view of an armature.

Referring to FIG. 3, the lamination stack 14 is illustrated without any coils wound thereon. The lamination stack 14 includes a plurality of radially projecting lamination posts 24, thereby defining a plurality of winding slots $S_1$-$S_{12}$. In an exemplary embodiment, twelve slots $S_1$-$S_{12}$ are formed between the posts 24, such that the number of commutator bars $12_1$-$12_{18}$ is one and one half times the number of winding slots $S_1$-$S_{12}$. It will be appreciated, however, that while twelve winding slots are illustrated, that a greater or lesser number of winding slots could be employed. Likewise, a greater or lesser number of commutator bars could be employed. In any case, the number of commutator bars is preferably an integer greater than the number of winding slots but less than twice the number of winding slots provided by the armature. Because the number of commutator bars is less than twice the number of winding slots, the size (i.e., diameter) of the commutator 12 can be reduced, thereby reducing the overall size of the motor.

Figure 4:
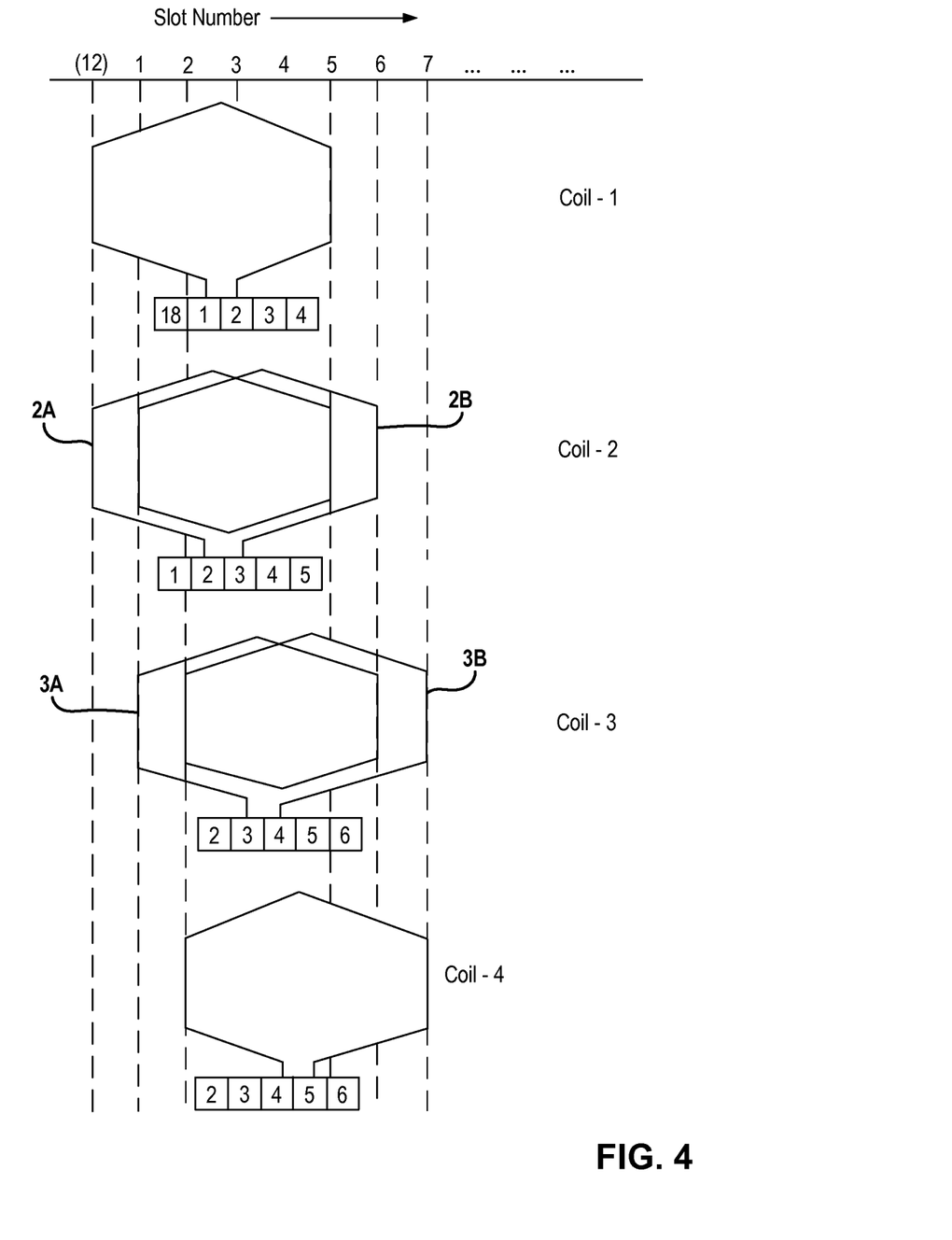
FIG. 4 is a diagram illustrating a distributed winding pattern in accordance with the present disclosure.
Figure 5:
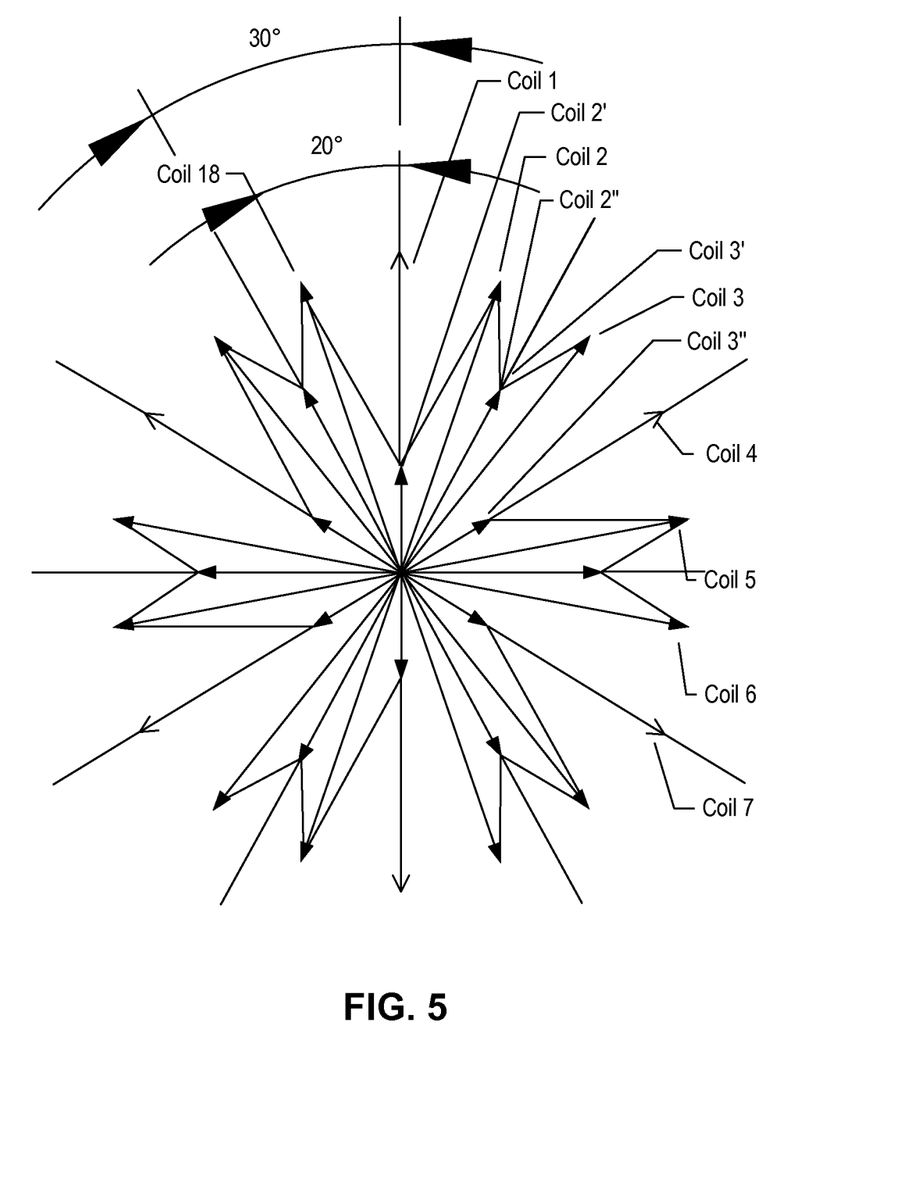
FIG. 5 is a diagram illustrating the resulting magnetic axes for the distributed winding pattern.

FIG. 4 illustrates a distributed winding pattern that maintains commutation efficiency in the motor arrangement above. Coil number 1 ($25_1$) has one end thereof coupled to commutator segment number $12_1$ and the other end coupled to commutator segment number $12_2$. Coil number 1 includes a first plurality of winding turns, for example twelve turns, which are wound around slots $S_{12}$ and $S_5$ of the lamination stack 14. It will be appreciated that the precise number of windings of each coil (or subcoil portion) can vary depending on the number of winding slots and the number of commutator bars in the motor arrangement.

Coil number 2 ($25_2$) has a first subcoil portion 2A and a second subcoil 2B in series with one another. First subcoil portion 2A is wound in slots $S_{12}$ and $S_5$ with one third the number of winding turns of coil number 1; whereas, the second subcoil portion 2B is wound in slots $S_1$ and $S_6$ with two thirds the number of winding turns of coil 1. In the exemplary embodiment, the first subcoil portion 2A is wound with four (4) winding turns and the second subcoil portion 2B is wound with eight (8) winding turns. The end of first subcoil portion 2A is coupled to commutator segment $12_2$ while the end of second subcoil portion 2B is coupled to commutator segment $12_3$. Windings of the first subcoil portion 2A of coil $25_2$ overlaps with the windings of the first coil $25_1$.

Coil number 3 ($25_3$) also includes a first subcoil portion 3A and a second subcoil portion 3B in series with one another. First subcoil portion 3A is wound in slots $S_1$ and $S_6$ with two thirds the number of winding turns of coil number 1; whereas, the second subcoil portion 3B is wound in slots $S_2$ and $S_7$ with one third the number of winding turns of coil number 1. In the exemplary embodiment, the first subcoil portion 3A is wound with eight (8) winding turns and the second subcoil portion 3B is wound with four (4) winding turns. The end of first subcoil portion 3A is coupled to commutator segment $12_3$ while the end of second subcoil portion 3B is coupled to commutator segment $12_4$. Windings of the first subcoil portion 3A of coil $25_3$ overlaps with the windings of the second subcoil portion of coil $25_2$.

Coil number 4 ($25_4$) has one end thereof coupled to commutator segment number $12_4$ and the other end coupled to commutator segment number $12_5$. Coil number 4 includes a plurality of winding turns, for example twelve turns, which are wound around slots $S_2$ and $S_7$ of the lamination stack 14. It will be noted that the windings of coil number 4 $25_4$ overlaps with the windings of the second subcoil portion 3B of coil $25_3$.

The above-described winding pattern for coils $25_1$-$25_4$ is repeated until all of the coils (in this example, 18 coils) are wound onto the lamination stack 14. Each of the ends of the coils $25_1$-$25_{18}$ are further secured to immediately adjacent pairs of commutator segments $12_1$-$12_{18}$. For example, coil $25_5$ has its ends secured to commutator segments $12_5$ and $12_6$, coil $25_6$ to segments $12_6$ and $12_7$, and so forth.

Figure 6:
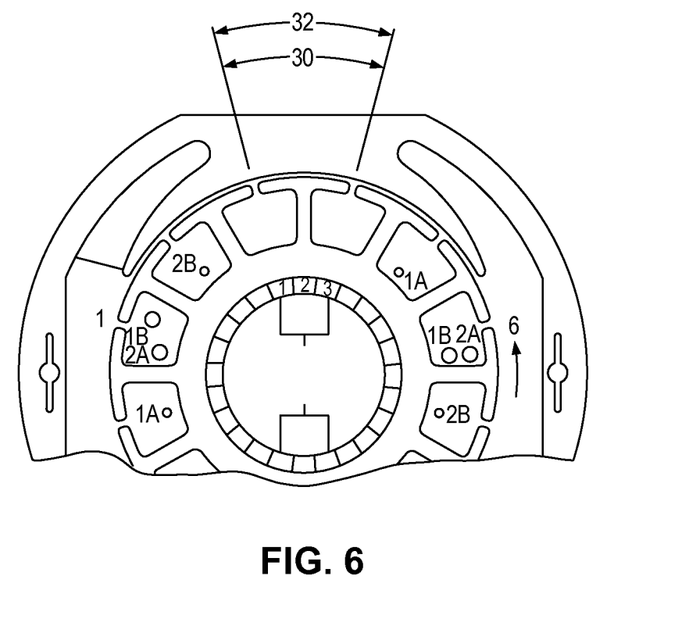
FIG. 6 is a simplified diagrammatic end view of the armature illustrating how commutation zones radially align with each other.

FIG. 6 illustrating the resulting magnetic axes for the distributed winding pattern described above. In this example, the resultant magnetic axis for coil 1 ($25_1$) is at the center of slot one $S_1$. The resultant magnetic axis for coil 2 is shifted laterally 20 degrees away from the magnetic axis of coil 1. Likewise, the resultant magnetic axis for the coil 3 is shifted laterally 20 degrees away from the magnetic axis of coil 2 and so forth. In this way, the winding pattern results in eighteen (18) magnetic axes that are spaced radially an equal distance (i.e., 20 degrees) from each other.

The above-described winding pattern significantly improves the commutation performance. Splitting portions of coils 25 into first and second subcoil portions allows the subcoil portions to shift the magnetic axis (i.e., laterally), from the position it would have otherwise had in a traditional two-coil-per-slot approach. This is illustrated in FIG. 6. For example, a first subcoil portion shifts their magnetic axes forward to produce a first coil commutation zone, as indicated by line 30, and a second subcoil portion shifts their magnetic axes backward to produce a second coil commutation zone, as indicated by line 32, in reference to the armature's 10 rotational direction. Both of these commutation zones are now in a magnetic neutral zone between field coils 34. With an appropriate turns ratio between coils and subcoils thereof, this winding pattern smooths out the magnetic "unevenness" between adjacent coils, which is a drawback with traditional two-coil-per-slot winding patterns. This, in connection with the shifting of the resultant magnetic axes of each coil, serves to significantly improve the commutation efficiency of the motor and to reduce the overall brush arcing.

Figure 7:
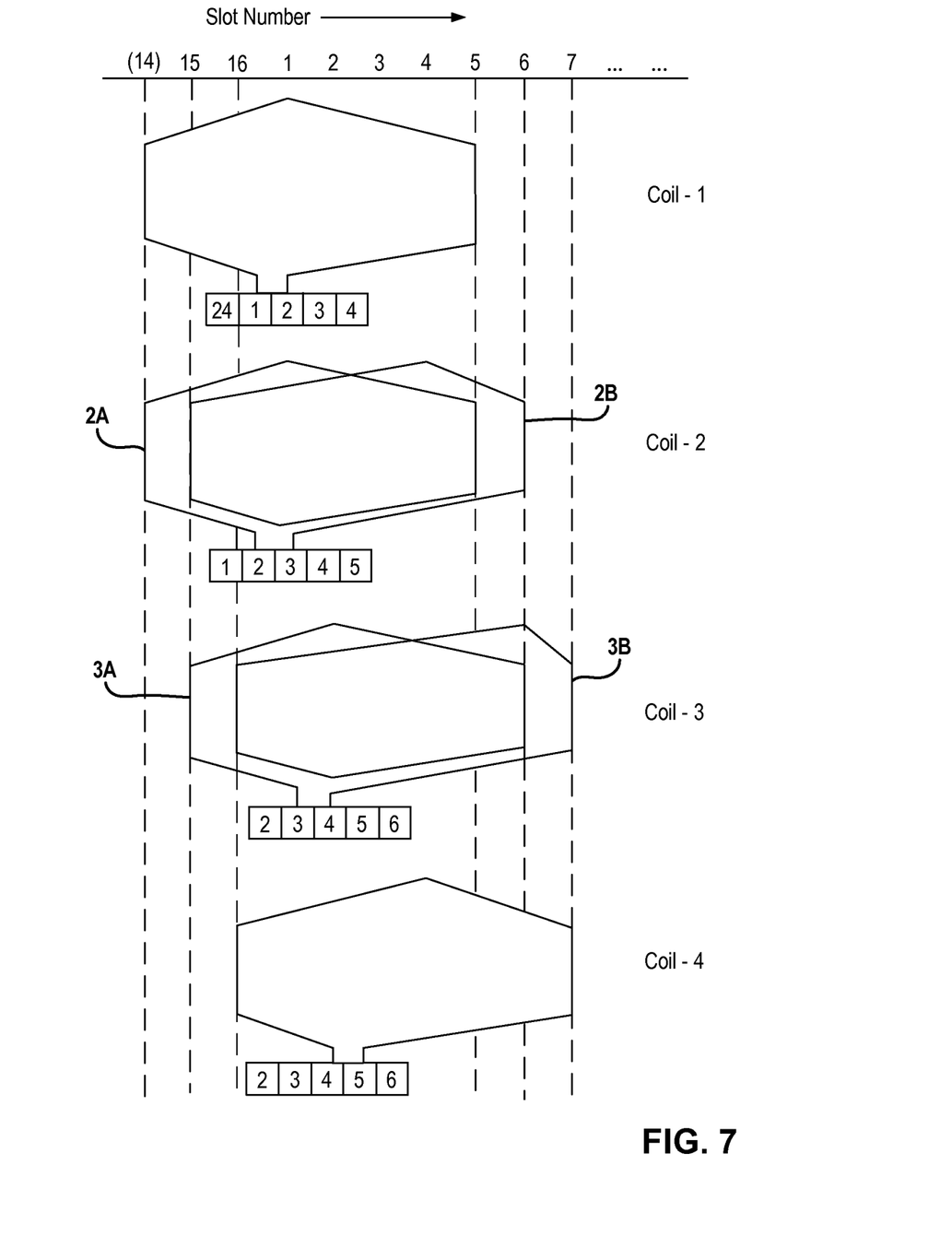
FIG. 7 is a diagram illustrating an alternative winding pattern in accordance with the present disclosure.

FIG. 7 illustrates an alternative distributed winding pattern that maintains commutation efficiency. In this motor arrangement, the commutator 12 includes twenty-four (24) commutator bars $12_1$-$12_{24}$ and the armature 12 includes a plurality of lamination posts which thereby define sixteen (16) winding slots $S_1$-$S_{16}$. The winding pattern for this arrangement is further described below.

Coil number 1 ($25_1$) has one end thereof coupled to commutator segment number $12_1$ and the other end coupled to commutator segment number $12_2$. Coil number 1 includes a first plurality of winding turns, for example twelve turns, which are wound around slots $S_{14}$ and $S_5$ of the lamination stack 14. It will be appreciated that the precise number of windings of each coil (or subcoil portion) can vary depending on the number of winding slots and the number of commutator bars in the motor arrangement.

Coil number 2 ($25_2$) has a first subcoil portion 2A and a second subcoil 2B in series with one another. First subcoil portion 2A is wound in slots $S_{14}$ and $S_5$ with one third the number of winding turns of coil number 1; whereas, the second subcoil portion 2B is wound in slots $S_{15}$ and $S_6$ with two thirds the number of winding turns of coil 1. In the exemplary embodiment, the first subcoil portion 2A is wound with four (4) winding turns and the second subcoil portion 2B is wound with eight (8) winding turns. The end of first subcoil portion 2A is coupled to commutator segment $12_2$ while the end of second subcoil portion 2B is coupled to commutator segment $12_3$. Windings of the first subcoil portion 2A of coil $25_2$ overlaps with the windings of the first coil $25_1$.

Coil number 3 ($25_3$) also includes a first subcoil portion 3A and a second subcoil portion 3B in series with one another. First subcoil portion 3A is wound in slots $S_{15}$ and $S_6$ with two thirds the number of winding turns of coil number 1; whereas, the second subcoil portion 3B is wound in slots $S_{16}$ and $S_7$ with one third the number of winding turns of coil number 1. In the exemplary embodiment, the first subcoil portion 3A is wound with eight (8) winding turns and the second subcoil portion 3B is wound with four (4) winding turns. The end of first subcoil portion 3A is coupled to commutator segment $12_3$ while the end of second subcoil portion 3B is coupled to commutator segment $12_4$. Windings of the first subcoil portion 3A of coil $25_3$ overlaps with the windings of the second subcoil portion of coil $25_2$.

Coil number 4 ($25_4$) has one end thereof coupled to commutator segment number $12_4$ and the other end coupled to commutator segment number $12_5$. Coil number 4 includes a plurality of winding turns, for example twelve turns, which are wound around slots $S_{16}$ and $S_7$ of the lamination stack 14. It will be noted that the windings of coil number 4 $25_4$ overlaps with the windings of the second subcoil portion 3B of coil $25_3$.

The above-described winding pattern for coils $25_1$-$25_4$ is repeated until all of the coils (in this example, 24 coils) are wound onto the lamination stack 14. Each of the ends of the coils $25_1$-$25_{24}$ are further secured to immediately adjacent pairs of commutator segments $12_1$-$12_{24}$. For example, coil $25_5$ has its ends secured to commutator segments $12_5$ and $12_6$, coil $25_6$ to segments $12_6$ and $12_7$, and so forth.

The winding pattern employed on the armature reduces the number of commutator segments which in turn reduces the size of the commutator and the motor. The winding pattern employed also serves to significantly reduce the cost of constructing the armature by eliminating components that would otherwise be needed to sufficiently attenuate the EMI that results from traditional two-coil-per-slot winding patterns. Typically, inductive components are required to form a choke circuit associated with each armature brush. These additional components increase the overall cost of manufacturing a motor, as well as increase the complexity of the task of replacing the brushes during repair procedures.

The apparatus and method of the present disclosure thus allows an armature to be formed which significantly reduces brush arcing, and therefore the EMI that is present with traditional two-coil-per-slot armature constructions for all brush commutated electric motors. The apparatus and method of the present disclosure further does not increase the complexity of the manufacturing process or require additional component parts that would otherwise increase the overall cost of construction of an armature and the motor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric motor, comprising:
  an armature having a plurality of spaced apart posts defining a plurality of spaced apart winding slots;
  a commutator having a plurality of commutator bars, where the number of commutator bars is an integer greater than the number of winding slots but less than twice the number of winding slots;
  a stator disposed coaxially with the armature, the stator having a plurality of spaced apart field coils;
  the armature including:
    a first coil having a first plurality of winding turns wound only in a first pair of spaced apart ones of the winding slots and;
    a second coil having a first and second subcoil portions serially coupled together, the first subcoil portion having a plurality of winding turns wound in the first pair of spaced apart winding slots, and the second subcoil portion having a plurality of winding turns wound in a second pair of spaced apart winding slots that are circumferentially offset from the first pair of spaced apart winding slots, wherein the first coil and the first subcoil portion of the second coil are wound with different number of winding turns so that a resultant magnetic axis of the first coil lies at a predetermined angular position relative to a first pair of commutator bars to which the first coil is secured;
    a third coil having a first and second subcoil portions serially coupled together, the first subcoil portion having a plurality of winding turns wound in the second pair of spaced apart winding slots, and the second subcoil portion having a plurality of winding turns wound in a third pair of spaced apart winding slots that are circumferentially offset from the second pair of spaced apart winding slots, wherein the second subcoil portion of the second coil and the first subcoil portion of the third coil are wound with different number of winding turns so that a resultant magnetic axis of the second coil lies at a predetermined angular position relative to a second pair of commutator bars to which the second coil is secured.

2. The electric motor of claim 1 wherein the armature further includes a fourth coil having a plurality of winding turns wound only in the third pair of spaced apart winding slots, wherein the second subcoil portion of the third coil and the fourth coil are wound with different number of winding turns so that a resultant magnetic axis of the third coil lies at a predetermined angular position relative to a third pair of commutator bars to which the third coil is secured.

3. The electric motor of claim 1 further comprises at least one brush disposed adjacent to the commutator, wherein the first, second and third coils begin commutation at the same angular position relative to the brush and end commutation at the same angular position relative to the brush.

4. The electric motor of claim 1 wherein the number of winding slots is defined as twelve and the number of commutator bars is defined as eighteen.

5. The electric motor of claim 4 wherein the first subcoil portion of the second coil having a plurality of winding turns that is one third the number of winding turns of the first coil, and the second subcoil portion of the second coil having a plurality of winding turns that is two thirds the number of winding turns of the first coil.

6. The electric motor of claim 5 wherein first subcoil portion of the third coil having a plurality of winding turns that is two thirds the number of winding turns of the first coil, and the second subcoil portion of the third coil having a plurality of winding turns that is one third the number of winding turns of the first coil.

7. The electric motor of claim 1 wherein the number of commutator bars is one and one half the number of winding slots.

8. The electric motor of claim 1 resides in a power tool.

9. An electric motor, comprising:
an armature having a plurality of spaced apart posts defining a plurality of spaced apart winding slots;
a commutator having a plurality of commutator bars, such that the number of commutator bars is one and one half the number of winding slots;
a stator disposed coaxially with the armature, the stator having a plurality of spaced apart field coils;
the armature including:
a first coil being wound in a first pair of spaced apart ones of the winding slots and having a first plurality of winding turns;
a second coil having a first and second subcoil portions, the first subcoil portion being wound in the first pair of spaced apart winding slots so as to overlap the first coil and having a plurality of winding turns that is one third the number of winding turns of the first plurality of winding turns, and the second subcoil portion being wound in a second pair of spaced apart winding slots that are offset from the first pair of spaced apart winding slots and having a plurality of winding turns that is two thirds the number of winding turns of the first plurality of winding turns;
a third coil having a first and second subcoil portions, the first subcoil portion being wound in the second pair of spaced apart winding slots so as to overlap the second subcoil portion of the second coil and having a plurality of winding turns that is two thirds the number of winding turns of the first plurality of winding turns, and the second subcoil portion being wound in a third pair of spaced apart winding slots that are offset from the second pair of spaced apart winding slots and having a plurality of winding turns that is one third the number of winding turns of the first plurality of winding turns.

10. The electric motor of claim 9 wherein the armature further includes a fourth coil having a plurality of winding turns wound only in the third pair of spaced apart winding slots, wherein the second subcoil portion of the third coil and the fourth coil are wound with different number of winding turns so that a resultant magnetic axis of the third coil lies at a predetermined angular position relative to a third pair of commutator bars to which the third coil is secured.

11. The electric motor of claim 9 further comprises at least one brush disposed adjacent to the commutator, wherein the first, second and third coils begin commutation at the same angular position relative to the brush and end commutation at the same angular position relative to the brush.

12. The electric motor of claim 1 wherein the number of winding slots is defined as twelve and the number of commutator bars is defined as eighteen.

13. The electric motor of claim 12 wherein the first subcoil portion of the second coil having a plurality of winding turns that is one third the number of winding turns of the first coil, and the second subcoil portion of the second coil having a plurality of winding turns that is two thirds the number of winding turns of the first coil.

14. The electric motor of claim 12 wherein first subcoil portion of the third coil having a plurality of winding turns that is two thirds the number of winding turns of the first coil, and the second subcoil portion of the third coil having a plurality of winding turns that is one third the number of winding turns of the first coil.

15. An electric motor, comprising:
an armature having a plurality of spaced apart posts defining a plurality of spaced apart winding slots;
a commutator having a plurality of commutator bars, where the number of commutator bars is an integer greater than the number of winding slots but less than twice the number of winding slots;
a stator disposed coaxially with the armature, the stator having a plurality of spaced apart field coils;
the armature including:
a first coil having a first plurality of winding turns wound only in a first pair of spaced apart ones of the winding slots and;
a second coil having a first and second subcoil portions serially coupled together, the first subcoil portion having a plurality of winding turns wound in the first pair of spaced apart winding slots, and the second subcoil portion having a plurality of winding turns wound in a second pair of spaced apart winding slots that are circumferentially offset from the first pair of spaced apart winding slots, wherein the first coil and the first subcoil portion of the second coil are wound with different number of winding turns so that a resultant magnetic axis of the first coil lies at a predetermined angular position relative to a first pair of commutator bars to which the first coil is secured;
a third coil having a first and second subcoil portions serially coupled together, the first subcoil portion having a plurality of winding turns wound in the second pair of spaced apart winding slots, and the second subcoil portion having a plurality of winding turns wound in a third pair of spaced apart winding slots that are circumferentially offset from the second pair of spaced apart winding slots, wherein the second subcoil portion of the second coil and the first subcoil portion of the third coil are wound with different number of winding turns so that a resultant magnetic axis of the second coil lies at a predetermined angular position relative to a second pair of commutator bars to which the second coil is secured.

16. The electric motor of claim 15 wherein the armature further includes a fourth coil having a plurality of winding turns wound only in the third pair of spaced apart winding slots, wherein the second subcoil portion of the third coil and the fourth coil are wound with different number of winding turns so that a resultant magnetic axis of the third coil lies at a predetermined angular position relative to a third pair of commutator bars to which the third coil is secured.

17. The electric motor of claim 15 further comprises at least one brush disposed adjacent to the commutator, wherein the first, second and third coils begin commutation at the same angular position relative to the brush and end commutation at the same angular position relative to the brush.

18. The electric motor of claim 15 wherein the number of winding slots is defined as twelve and the number of commutator bars is defined as eighteen.

19. The electric motor of claim 18 wherein the first subcoil portion of the second coil having a plurality of winding turns that is one third the number of winding turns of the first coil, and the second subcoil portion of the second coil having a plurality of winding turns that is two thirds the number of winding turns of the first coil.

20. The electric motor of claim 19 wherein first subcoil portion of the third coil having a plurality of winding turns that is two thirds the number of winding turns of the first coil, and the second subcoil portion of the third coil having a plurality of winding turns that is one third the number of winding turns of the first coil.

\* \* \* \* \*